United States Patent
Darwiche et al.

(10) Patent No.: US 11,661,344 B2
(45) Date of Patent: May 30, 2023

(54) METHOD FOR THE PURIFICATION OF RAW CARBON NANOTUBES

(71) Applicants: HYDRO-QUÉBEC, Québec (CA); Arkema France, Colombes (FR)

(72) Inventors: Ali Darwiche, Longueuil (CA); Martin Dontigny, Varennes (CA); Naoyuki Kondo, Québec (CA); Abdelbast Guerfi, Québec (CA); Karim Zaghib, Québec (CA); Julien Beausoleil, Lescar (FR); Alexander Korzhenko, Pau (FR)

(73) Assignees: HYDRO-QUEBEC, Montreal (CA); ARKEMA FRANCE, Colombes (FR)

( * ) Notice: Subject to any disclaimer, the term of this patent is extended or adjusted under 35 U.S.C. 154(b) by 743 days.

(21) Appl. No.: 16/498,537

(22) PCT Filed: Mar. 29, 2018

(86) PCT No.: PCT/IB2018/052192
§ 371 (c)(1),
(2) Date: Sep. 27, 2019

(87) PCT Pub. No.: WO2018/178929
PCT Pub. Date: Oct. 4, 2018

(65) Prior Publication Data
US 2021/0107791 A1 Apr. 15, 2021

Related U.S. Application Data

(60) Provisional application No. 62/479,688, filed on Mar. 31, 2017.

(30) Foreign Application Priority Data
Mar. 31, 2017 (FR) ..................... 17/52749

(51) Int. Cl.
*C01B 32/17* (2017.01)
*H01M 4/587* (2010.01)
(Continued)

(52) U.S. Cl.
CPC ............. *C01B 32/17* (2017.08); *H01M 4/587* (2013.01); *H01M 4/625* (2013.01);
(Continued)

(58) Field of Classification Search
CPC . C01B 32/17; C01B 2202/06; C01B 2202/22; C01B 2202/30; C01B 2202/32;
(Continued)

(56) References Cited

U.S. PATENT DOCUMENTS

| 7,799,246 B2 | 9/2010 | Bordere et al. |
| 8,771,627 B2 | 7/2014 | Bordere et al. |

(Continued)

FOREIGN PATENT DOCUMENTS

| CN | 104900871 A | 9/2015 |
| EP | 3326965 A1 | 5/2018 |

(Continued)

OTHER PUBLICATIONS

Tange, Kyoichi, et al. "SWNTs Bundle Dispersion Study and Analysis of its Potential as a Hydrogen Tank." MRS Online Proceedings Library (OPL) 1042 (2007).*
(Continued)

*Primary Examiner* — Richard M Rump
(74) *Attorney, Agent, or Firm* — Buchanan Ingersoll & Rooney P.C.

(57) ABSTRACT

The present invention proposes a process for purifying raw carbon nanotubes to obtain an content in metallic impurities comprised between 5 ppm and 200 ppm. The process includes an increase in the bulk density of the raw carbon nanotubes via compacting to produce compacted carbon
(Continued)

nanotubes. The process further includes sintering the compacted carbon nanotubes by undergoing thermal treatment under gaseous atmosphere in order to remove at least a portion of the metallic impurities contained in the raw carbon nanotubes, and consequently producing purified carbon nanotubes. These purified carbon nanotubes are directly usable as electronic conductors serving as basis additive to an electrode material without requiring any subsequent purification step. The electrode material can then be used to manufacture an electrode destined to a lithium-ion battery.

17 Claims, 9 Drawing Sheets

(51) Int. Cl.
*H01M 10/0525* (2010.01)
*H01M 4/62* (2006.01)

(52) U.S. Cl.
CPC ..... *H01M 10/0525* (2013.01); *C01B 2202/06* (2013.01); *C01B 2202/22* (2013.01); *C01B 2202/30* (2013.01); *C01B 2202/32* (2013.01); *C01P 2004/50* (2013.01); *C01P 2004/54* (2013.01); *C01P 2006/11* (2013.01)

(58) Field of Classification Search
CPC .............. C01B 2202/26; H01M 4/587; H01M 10/0525; H01M 4/00; H01M 4/505; H01M 4/525; H01M 4/5825; H01M 4/625; C01P 2004/50; C01P 2004/54; C01P 2006/11; Y02E 60/10
See application file for complete search history.

(56) References Cited

U.S. PATENT DOCUMENTS

| | | | | |
|---|---|---|---|---|
| 2009/0124705 | A1* | 5/2009 | Meyer | B82Y 30/00 423/445 B |
| 2009/0194189 | A1 | 8/2009 | Bordere et al. | |
| 2016/0020466 | A1 | 1/2016 | Ulbrich et al. | |
| 2017/0144887 | A1* | 5/2017 | Li | B82Y 40/00 |

FOREIGN PATENT DOCUMENTS

| | | |
|---|---|---|
| EP | 2085312 B1 | 3/2020 |
| FR | 2966815 A1 | 4/2012 |
| JP | 2006-225245 A | 8/2006 |
| JP | 2006225244 A | 8/2006 |
| KR | 20140004985 U | 9/2014 |
| KR | 1020150122653 A | 11/2015 |
| KR | 1020170011779 A | 2/2017 |
| WO | 020064868 A1 | 8/2002 |
| WO | 2008126534 A1 | 10/2008 |
| WO | 2009008516 A1 | 9/2010 |
| WO | 2011111499 A1 | 9/2011 |
| WO | WO-2016008454 A1 * | 1/2016 ............... B01J 8/24 |
| WO | 2017018667 A1 | 2/2017 |
| WO | 2017039132 A1 | 3/2017 |
| WO | 2017048053 A1 | 3/2017 |

OTHER PUBLICATIONS

English machine translation of WO2011149A1.*
English machine translation of CN106794991.*
Chng, Elaine Lay Khim, et al. "Purification of carbon nanotubes by high temperature chlorine gas treatment." Physical Chemistry Chemical Physics 15.15 (2013): 5615-5619.*
Pumera, Martin, and Yuji Miyahara. "What amount of metallic impurities in carbon nanotubes is small enough not to dominate their redox properties?." Nanoscale 1.2 (2009): 260-265.*
Malara, Francesco, et al. "A free-standing aligned-carbon-nanotube/ nanocomposite foil as an efficient counter electrode for dye solar cells." Energy & Environmental Science 5.8 (2012): 8377-8383.*
Chew S Y et al, Flexible free-standing carbon nanotube films for model lithium-ion batteries, Carbon, Elsevier, Nov. 1, 2009, vol. 47, No. 13, Oxford, Great Britain.
Qin Guohui et al., A porous C/LiFePO4/multiwalled carbon nanotubes cathode material for Lithium ion batteries, Electrochimica Acta, Elsevier Science Publishers, Nov. 10, 2013, pp. 407-415, Barking, Great Britain.
Jin B et al., Electromechanical properties of LiFePO4-multiwalled carbon nanotubes composite cathode materials for lithium polymer battery, Electrochemistry Communications, Elsevier, Oct. 1, 2008, vol. 10, No. 10, Amsterdam, Netherlands.
European Patent Office, International Search Report, dated Nov. 8, 2018, Europe.
Third Party Observation in corresponding Japanese Application No. 2019-553296 issued on May 17, 2021.
Third Party Observation in corresponding European Patent No. 3601161 issued on Oct. 7, 2020.
Office Action (Request for the Submission of an Opinion) dated Dec. 15, 2022, by the Intellectual Property Office in corresponding Korean Patent Application No. 10-2022-098216624, and an English Translation of the Office Action. (15 pages).

* cited by examiner

METHOD FOR THE PURIFICATION OF RAW CARBON NANOTUBES

TECHNICAL FIELD

Present techniques relate to carbon nanotubes in general, and more particularly relate to the purification of raw carbon nanotubes to obtain purified nanotubes which are directly usable as electrode material.

BACKGROUND

Carbon nanotubes, also referred to as CNTs, benefit from excellent electrical and thermal conductivities, as well as mechanical flexibility and significantly large surface-area. They are made up from graphite sheets that are wound up and terminated by hemispheres consisting of pentagons and hexagons with a structure similar to fullerenes. Nanotubes are known to be composed of either a single sheet, also referred to as single-walled nanotubes (SWNTs); or of several concentric sheets, also referred to as multi-walled nanotubes (MWNTs). CNTs are therefore ideal candidates for a wide range of applications, especially as additives to enrich the electrical conductivity of electrodes, including anodes and cathodes, in lithium-ion batteries.

CNTs are however known to include non-carbon impurities, such as metallic or mineral impurities such as Fe, Mn, Cr, Co, Ni, Al, Mo, Va, and Si, and which are present in residual amounts according to CNTs manufacture processes. CNTs prepared according to a process which does not include a purification step aiming at reducing a total amount in impurities are referred to as raw CNTs in the present application. The total amount of non-carbon impurities in raw CNTs is generally between 2 and 20% in weight, which may be detrimental to the performance of electrodes from lithium-ion batteries.

Purification steps can be performed to reduce the level of impurities in the CNTs. For example, chlorine gas or nitrogen gas may be used as reactant to remove targeted metallic impurities.

Challenges remain to design a complete purification process from raw CNTs, including impurities, to obtain purified CNTs having an adequate purity level for direct use of the purified CNTs in various applications, such as lithium-ion batteries.

SUMMARY

There is provided a process aiming at purifying raw carbon nanotubes in order to directly use the purified carbon nanotubes according to their electronic application, and without requiring further purification thereof.

More particularly, there is provided a process of purification of raw carbon nanotubes comprising metallic impurities. The process comprises the following steps:
i) a compacting of the raw carbon nanotubes to produce compacted raw carbon nanotubes having a bulk density higher than that of the raw carbon nanotubes; and
ii) a sintering of the compacted raw carbon nanotubes including a thermal treatment under gaseous atmosphere, to remove at least a portion of the metallic impurities and produce purified carbon nanotubes.

According to an aspect of the process, the compacting of the raw carbon nanotubes comprises an agglomeration of the raw carbon nanotubes to produce agglomerated carbon nanotubes. The bulk density of the agglomerated carbon nanotubes is comprised between 0.1 and 0.8 g/cm$^3$.

According to another aspect of the process, the compacting of the raw carbon nanotubes comprises a briquetting of the raw carbon nanotubes to produce briquettes of carbon nanotubes. The bulk density of the briquettes of raw carbon nanotubes is comprised between 0.1 and 0.8 g/cm$^3$.

According to another aspect of the process, the compacting of the raw carbon nanotubes comprises an extrusion of the raw carbon nanotubes to produce granules or pellets of extruded raw carbon nanotubes. The bulk density of the granules or pellets of raw carbon nanotubes is comprised between 0.2 and 0.3 g/cm$^3$.

According to another aspect of the process, the compacting comprises at least one of the following steps:
an agglomeration;
a briquetting; and
an extrusion.

The compacting only comprises the agglomeration when the bulk density of the raw CNTs is of at least 0.2 g/cm$^3$.

According to certain aspects of the process, the gaseous atmosphere during thermal treatment can comprise chlorine gas, and wherein the metallic impurities are removed by a pulse vacuum system after chlorination of the metals by the chlorine gas.

According to other aspects of the process, the gaseous atmosphere during thermal treatment can comprise nitrogen gas, and wherein the metallic impurities are removed by vaporization.

According to certain aspects of the process, the thermal treatment is performed at a sintering temperature comprised between 1 200° C. and 3 000° C. Optionally, the thermal treatment can be performed in a pusher continuous kiln. Alternatively, the thermal treatment can be performed in a batch kiln.

According to certain aspects of the process, the latter can comprise adding an inorganic base in aqueous solution or adding water before, during or after the compacting of raw carbon nanotubes. For example, the aqueous solution of inorganic base or the water is added at a temperature between 20 and 80° C. In these conditions, the process can comprise a drying step in order to remove moisture from the compacted raw carbon nanotubes.

According to certain aspects of the process, the latter can comprise a step of conditioning the purified carbon nanotubes in order to produce conditioned purified carbon nanotubes for a direct application.

The step of conditioning can optionally comprise the dispersion of the purified carbon nanotubes to reduce the bulk density thereof. The bulk density after dispersion can be comprised between 0.21 and 0.25 g/cm$^3$. The conditioning step can also optionally comprise packaging the purified carbon nanotubes.

According to certain aspects of the process, the raw carbon nanotubes can be of a multi-walled type presenting a length/diameter ratio superior to 10, a specific surface area comprised between 100 and 300 m$^2$/g, and a bulk density comprised between 0.02 and 0.5 g/cm$^3$. Optionally, the purified carbon nanotubes can have a metallic impurities content between 5 ppm and 200 ppm. Optionally, the metallic impurities content of the purified carbon nanotubes is comprised between 5 ppm and 50 ppm. For example, the metallic impurities comprise iron.

There is also provided a use of the purified carbon nanotubes produced according to the process as defined herein, as carbonated additives to produce an electrode material.

There is also provided an electrode material including purified carbon nanotubes produced according to the process as defined herein.

The electrode material can also include, as electrochemically active material, particles of titanates, lithium titanates, lithium metal phosphates, vanadium oxides, lithium metal oxides, and combinations thereof. For example, the additional electrochemically active material may be $LiNi_{0.33}Mn_{0.33}Co_{0.33}O_2$ or $LiFePO_4$.

The electrode material can further include a supplemental conductive material, inorganic particles, salts and/or one or more binder(s).

There is also provided an electrode comprising the electrode material as defined herein. The electrode can be a positive or negative electrode from a lithium-ion battery.

There is also provided an electrochemical cell comprising an electrode as defined herein, a counter-electrode and an electrolyte.

While the invention will be described in conjunction with exemplary implementations, it will be understood that it is not intended to limit the scope of the invention to such implementations. On the contrary, it is intended to cover all alternatives, modifications and equivalents as may be included, as defined by the present description. The objects, advantages and other features of the process and related realizations will become more apparent and be better understood upon reading of the following non-restrictive description, given with reference to the accompanying drawings.

DETAILED DESCRIPTION

Figure 1:
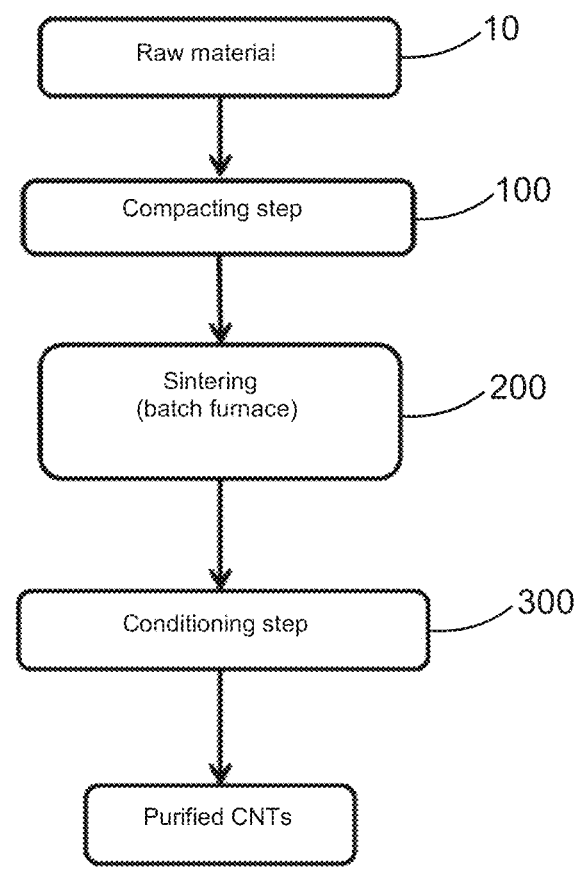
FIG. 1 is a flow diagram of a purification process according to an embodiment of the present invention.

CNTs may be synthesized according to various processes known by one skilled in the art. They can be divided in two families: "High temperature" (HT) and "Medium temperature" (MT) processes. HT processes such as "laser ablation" or "electric arc method" can lead to CNTs with a very low level of metallic contamination. However, they also lead to several carbon impurities and are not really used at industrial scale. MT processes are mainly based on C-CVD (catalytic chemical vapor deposition). This process is very selective in term of CNT synthesis and consists of breaking down a carbon source such as hydrocarbon which may be saturated, unsaturated, acyclic, cyclic or aromatic (ethylene, methane, ethane, acetylene, benzene . . . ), carbon monoxide or alcohol such as ethanol on a metallic catalyst at temperatures generally between 500° C. and 1500° C. The catalyst is thus trapped in the carbon structure and the carbon purity of CNT is therefore directly linked to the amount of catalyst used and to the yield of the synthesis.

For example, the synthesis may be carried out by contacting a catalyst containing a metal or a metal oxide iron on an organic or inorganic support (for example, $Fe_3O_4$ or Fe on a carbon support, Fe on an alumina carrier, or Fe on a carbon fibril support), with a compound containing gaseous carbon (CO or hydrocarbons), thereby generating gaseous compounds (e.g. CO, $H_2$ or $H_2O$).

It should be noted that the term "raw" refers herein to a state of the CNTs resulting directly from a synthesis process, without any subsequent purification step. Raw CNTs can therefore also be referred to as non-purified CNTs. Purification of a raw CNT refers to a decrease in the total content of non-carbon impurities, corresponding generally to the content of metallic impurities, contained in the raw CNT, according to at least one purification step, and to produce a purified CNT from the raw CNT. The raw CNT that are purified according to the invention may be of single-walled, or multi-walled type, optionally multi-walled type (MWNTs). The raw CNT that are purified according to the invention may be of renewable origin.

It should also be noted that the MWNTs can be produced, for example, according to the process defined in U.S. Pat. No. 7,799,246 or in U.S. Pat. No. 8,771,627, and corresponding to the raw CNTs produced and commercialized by the company Arkema.

The MWNTs may be characterized as follows: they have generally an average diameter ranging from 0.1 to 100 nm, optionally from 0.4 to 50 nm and, better still, from 1 to 30 nm, or even from 10 to 15 nm, and advantageously a length from 0.1 to 10 µm. Their length/diameter ratio is, optionally, greater than 10 and usually greater than 100. Their specific surface area is for example between 100 and 300 m²/g, advantageously between 200 and 300 m²/g, and their bulk density may especially be between 0.05 and 0.5 g/cm3 and more optionally between 0.1 and 0.2 g/cm3. They comprise from 5 to 15 sheets (or walls) and more optionally from 7 to 10 sheets.

However, one skilled in the art will understand that the techniques described herein are applicable and adaptable to any raw CNTs, unless obvious incompatibility.

CNTs are generally in the form of particles, which particle size pertains to the powder category, and in particular for which the mean particle diameter is about 400 microns. More specifically, CNTs can have a mean particle diameter from 1 µm to 1 mm, particularly of about 400 microns.

CNTs may be safety passed from one receptacle to another by using a double-valve device such as, for example, a device of the "Buck®" or "Glatt®" type, as described in the EP Patent No. 2085312.

As mentioned previously, raw CNTs can contain impurities derived from their synthesis process, including catalyzed synthesis. Purity of CNTs may be characterized by (quantity of CNTs formed)/(quantity of CNTs formed+ quantity of catalyst introduced) ratio, the catalyst consisting of a metal supported on an inorganic solid and the metal including Fe, Co, Mo, Ni, V and their combinations.

Impurities may also be quantified by the number of ppm contained in synthesized CNTs. For example, raw CNT material (or raw CNTs) may include between 6000 ppm and 50000 ppm, optionally between 7000 ppm and 9000 ppm, further optionally between 7500 ppm and 8000 ppm, and further optionally 7800 or 25000 ppm of metallic impurities, such as iron.

Presence of impurities in the CNTs can be detrimental to the performance of systems in which these CNTs are implemented, e.g. in lithium battery electrodes (accumulator with an anode including metallic lithium) or lithium-ion battery electrodes (accumulator with anode and/or cathode including intercalated ionic lithium).

In a first aspect of the invention, there is provided a purification process of raw CNTs including steps and operating conditions tailored to decrease the impurity level of the raw CNTs and produce purified CNTs, having a purity grade adequate for direct commercial use.

It should be noted that raw CNTs are generally provided as CNT powder which consists of CNT particle aggregates of quasi-spherical shape of different sizes, from 1 µm to 1 mm. The interstitial void volume (between particles) is directly related to the bulk density of the raw CNT powder.

In a first time, the proposed process notably includes compacting the CNTs to increase a bulk density thereof, before proceeding to a thermal treatment of the compacted CNTs. It should be understood that increasing the bulk density of the raw CNT powder via compacting results from reducing the interstitial void volume ("inter-tubes" void volume) of the raw CNT powder.

Compacted CNTs can be found under different shapes including agglomerates, granules, pellets or briquettes. The final shape of compacted CNTs is directly related to the technique(s) which has(have) been used to perform compacting. These techniques include agglomerating, extrusion, briquetting or a combination thereof.

As a result of compacting, aggregates of CNTs particles may be partially overlapped, or over merged. A successful compacting enables to obtain a bulk density of compacted CNTs which is higher than the bulk density of the raw CNT particles.

According to the process of the invention, increasing the bulk density of the raw CNTs may allow enhancing the production rate, improving thermal exchanges during the thermal treatment, and maximizing the product density of the purified CNTs. For example, performing the compacting step aiming at increasing the bulk density of the raw material, allows reduction of the number of operation lines to be used for a subsequent sintering step, and further reduction of the total cost of the purification process.

Additionally, the purification process comprises a sintering step, which includes a thermal treatment of the raw CNTs in presence of a gas medium, during which the metallic impurities are vaporized and/or chemically converted so as to remove them from the raw CNTs. Purified CNTs are thereby produced. When considering removal of metallic impurities such as iron, chlorine gas or nitrogen gas may be used as a reactive gas medium during the sintering step. The thermal treatment may be implemented in a pusher continuous kiln or in a batch kiln. Chlorine gas is rather used as gas medium in the batch kiln whereas nitrogen can be used for both types of previously mentioned kilns.

It should be noted that the purification process may reduce the level of impurities by at least 90%, optionally at least 95%, and particularly about 99.9%. For example, design of the process equipment and operating conditions can be varied, optimized and tailored to purify raw CNTs having a metallic impurity level between 6 000 ppm and 50 000 ppm, and to produce purified CNTs having a reduced metallic impurity level between 5 ppm and 200 ppm, optionally between 10 ppm and 100 ppm, and further optionally less than 50 ppm. The metal can include iron.

It should be noted that the previously described compacting step can be performed before or after the sintering step. Optionally, compacting is performed before sintering.

According to an embodiment of the process, a conditioning step can be also performed in order to condition the purified CNTs according to their subsequent commercial application. Conditioning may include dispersing and packaging of the purified CNTs, or only packaging of the purified CNTs.

In some implementations, the process may include adding a small amount of inorganic base, such as LiOH, KOH, NaOH or a combination thereof to the powder of raw CNTs. It has been found that addition of an inorganic base to the powder of raw CNTs can enhance impurities degassing during the subsequent thermal treatment at high temperatures.

According to an embodiment of the process, a small amount of water or aqueous solution of an inorganic base, such as LiOH, KOH, NaOH or a combination of these inorganic bases, can be added to the raw CNT powder. It has been found that addition of an inorganic base to raw CNT powder can enhance impurities degassing during the subsequent thermal treatment at high temperatures.

Particularly, water, optionally water at a temperature between ambient temperature and 80° C. can be used to perform such a step. Indeed, water may contain inorganic bases or carbonates or hydro carbonates (LiOH, NaOH, KOH, $Na_2CO_3$, etc.) or alkaline organic salts (acetates, maleates, CMC salts, etc.). These compounds can further react with catalyzer impurities and further accelerate the purification process of raw CNTs during sintering via heat treatment.

Addition of inorganic base in aqueous solution, or addition of water may be performed before, during or after the compacting step of the process. In the case where this addition is performed according to the process, a step of drying may be implemented to remove moisture of the compacted CNTs. For example, the process can include adding water during compacting via agglomeration raw CNT powder, before a sintering step.

Figure 2:
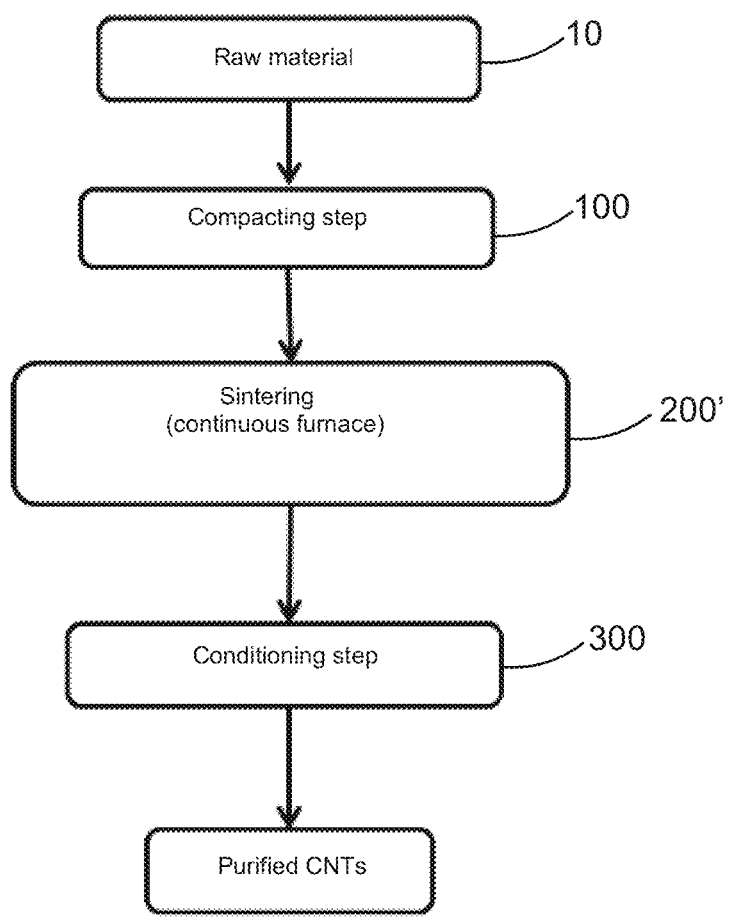
FIG. 2 is a flow diagram of a purification process according to another embodiment of the present invention.
Figure 3:
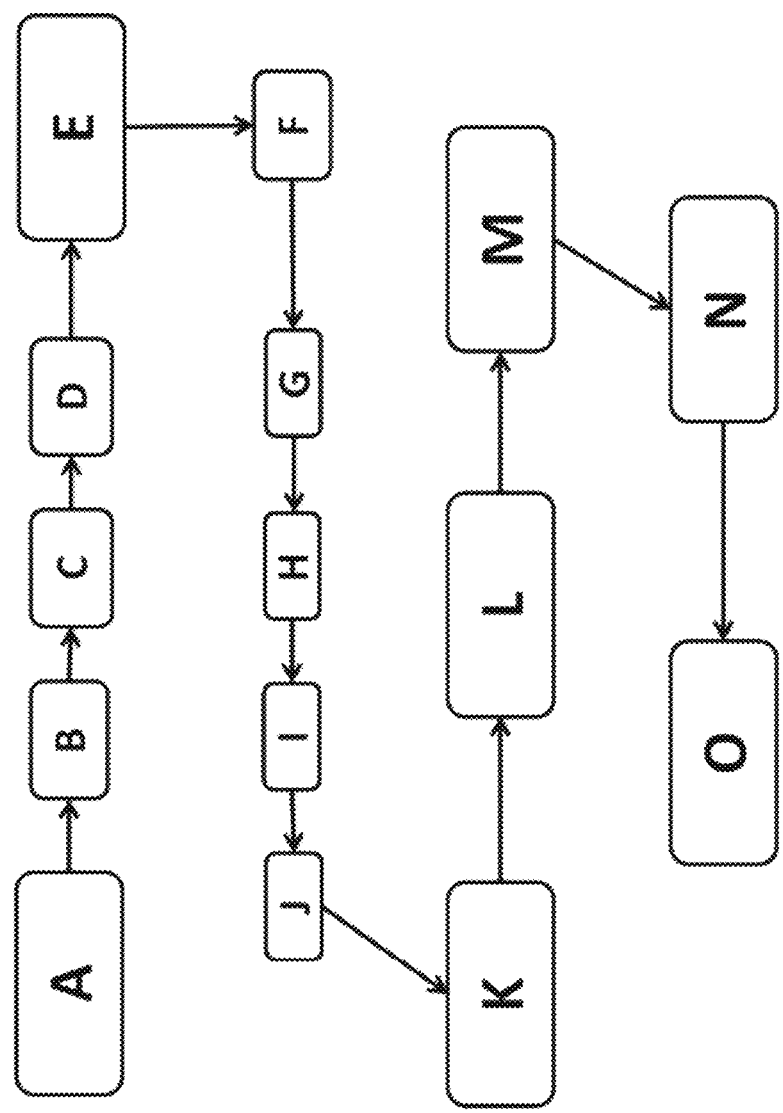
FIG. 3 is a complete process flow diagram of the purification showing successive steps of agglomeration, briquetting, and sintering according to another embodiment of the present invention.
Figure 4:
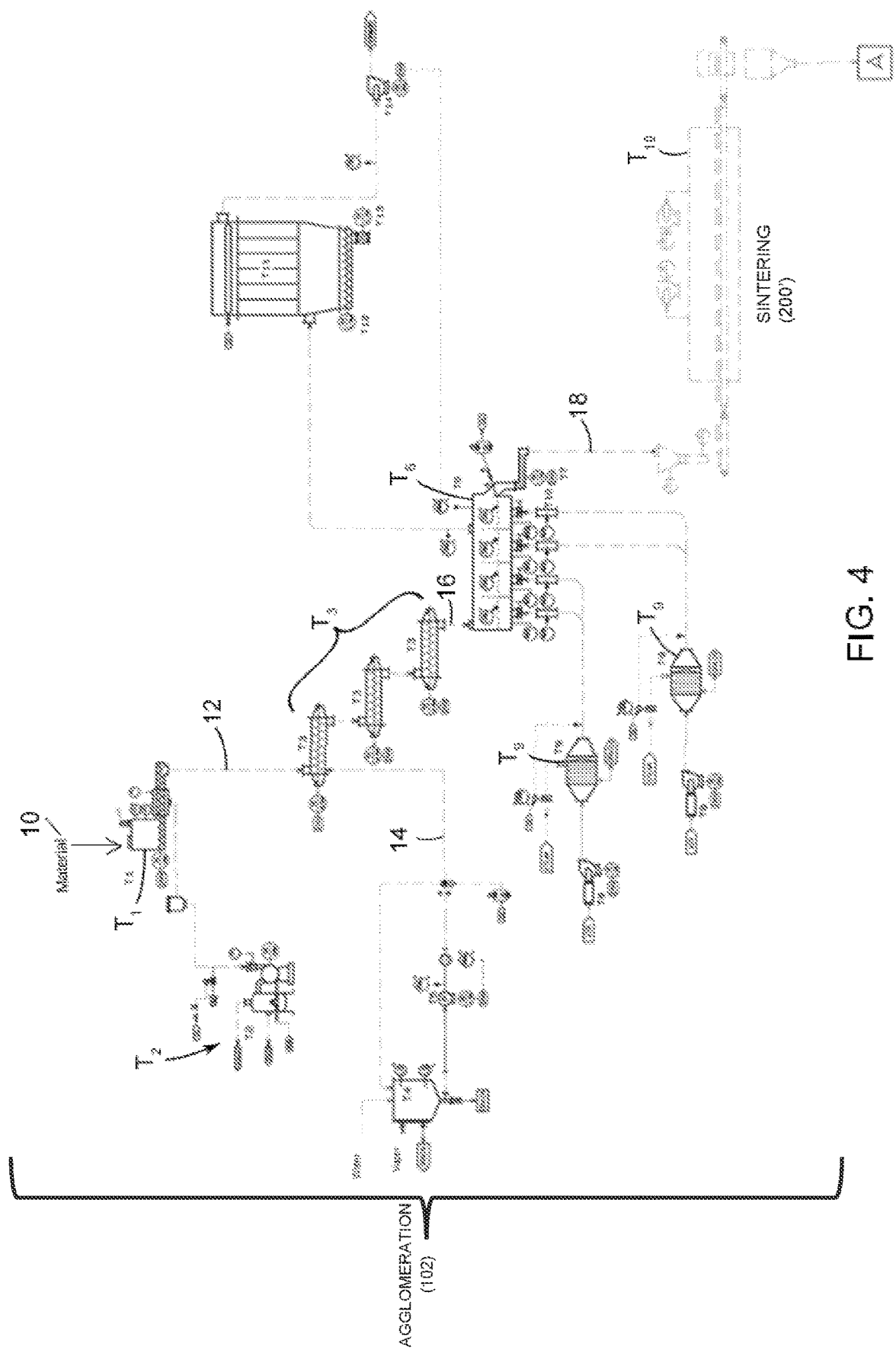
FIG. 4 is a partial process flow diagram showing successive agglomeration and sintering steps according to another embodiment of the present invention.
Figure 5:
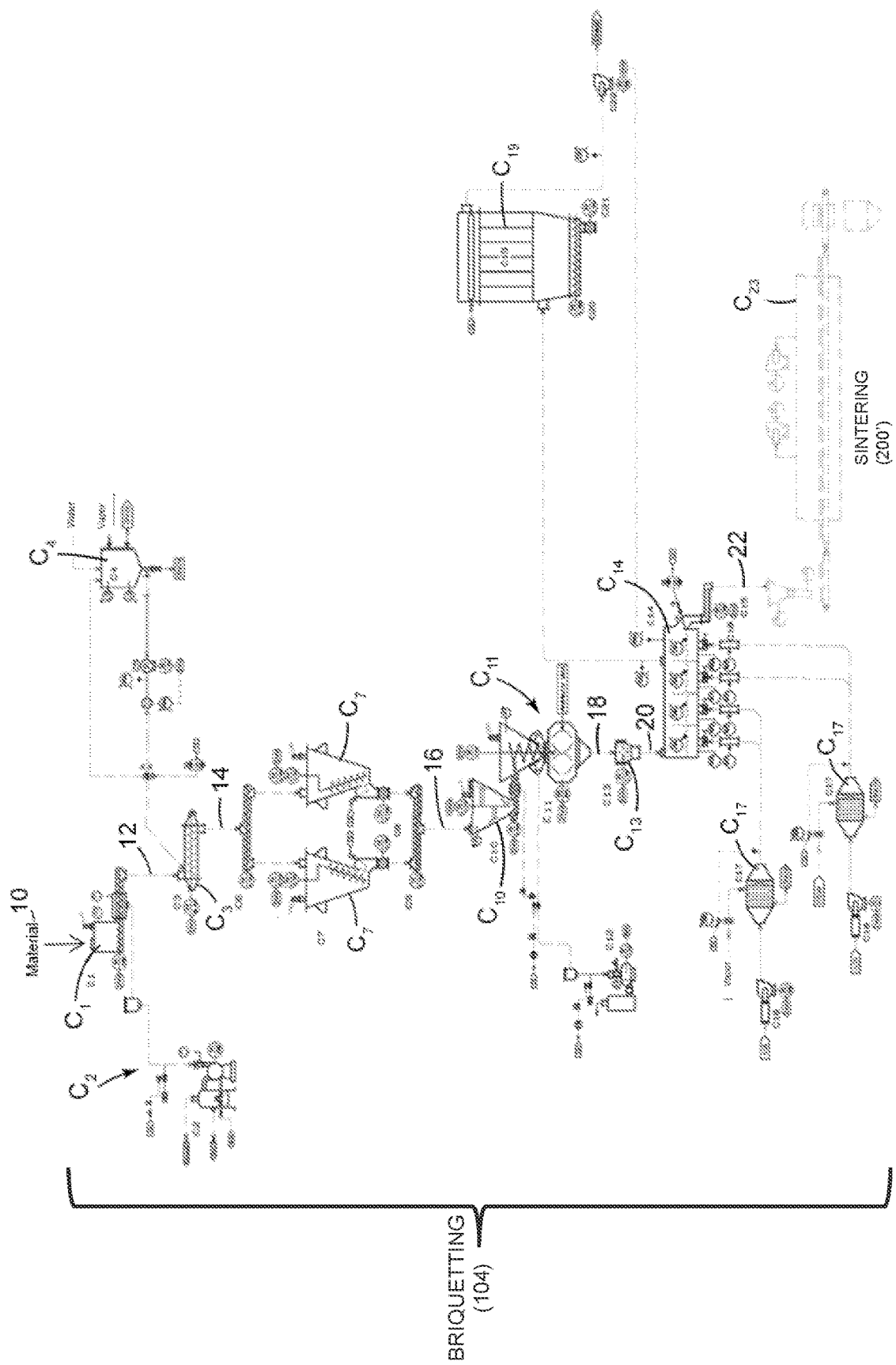
FIG. 5 is a partial process flow diagram showing successive briquetting and sintering steps according to another embodiment of the present invention.
Figure 6:
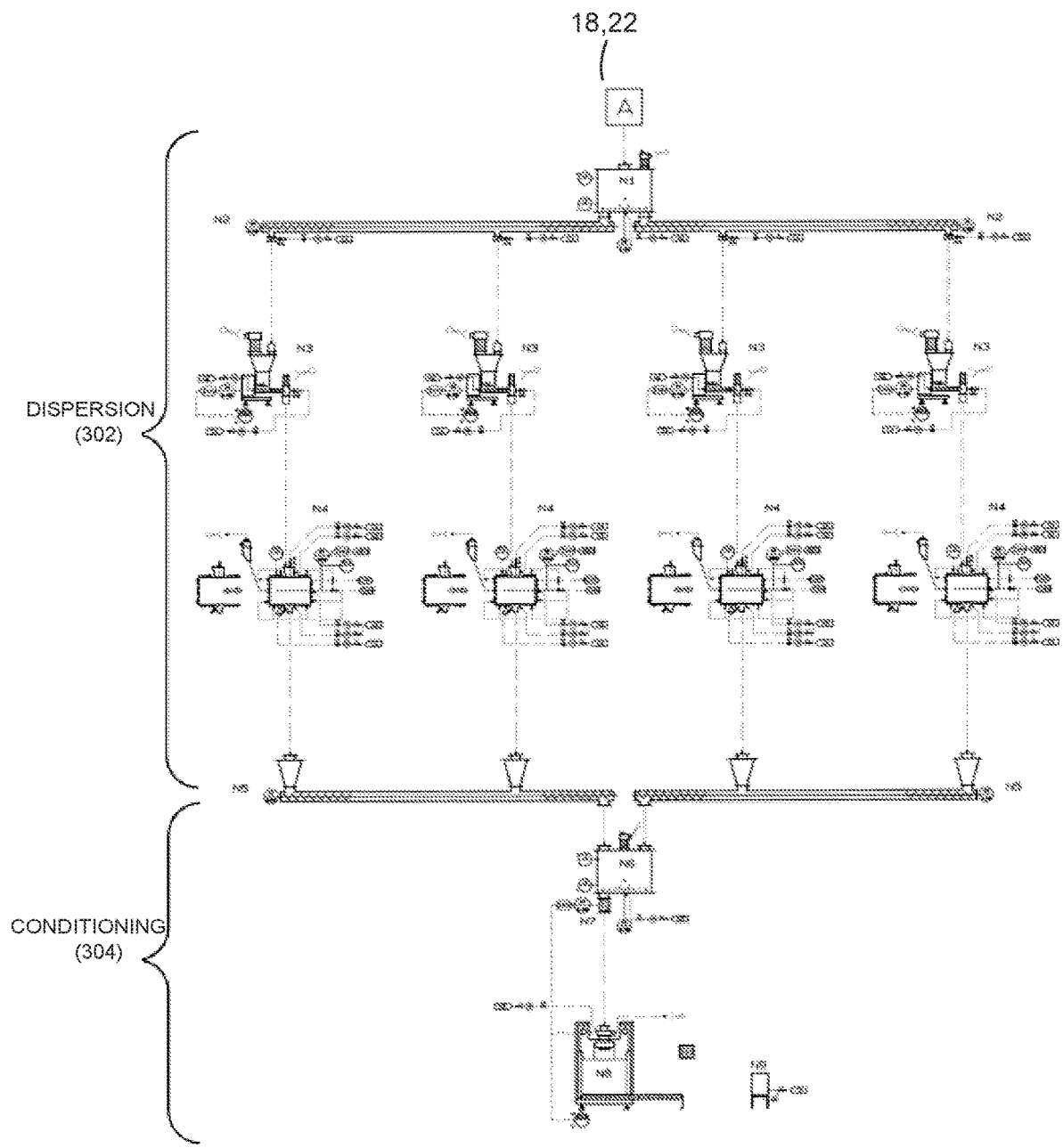
FIG. 6 is a partial process flow diagram showing successive dispersing and packaging steps according to another embodiment of the present invention.

FIGS. 1, 2 and 3 illustrate the general process steps according to the present invention enabling purification of raw CNTs which have been directly synthesized. FIGS. 4 and 5 provide exemplary implementations of the compacting (agglomeration and/or briquetting) and sintering steps from FIG. 1. FIG. 6 provides exemplary implementations of the conditioning (dispersing and/or packaging) step from FIG. 1. FIGS. 4 to 9 will be detailed in the experimentation section.

Bulk Density Increase Implementations

Agglomeration

In some implementations, compacting may include agglomerating the powder of raw CNTs to produce an agglomerated powder of raw CNTs before subjecting the raw CNTs to the thermal treatment.

It should be noted that CNTs tend to naturally agglomerate and that the agglomeration step is used to enhance agglomeration thereof.

Referring to FIG. 3, in order to increase the bulk density, the raw material (A) is treated as follows: the raw material is deaerated in a vacuum-deaerated system (B) to remove dissolved corrosive gases ($O_2$, $CO_2$). Then it is transferred to a mixer (C) where the material is mixed in the presence of a hot water. Before briquetting and sintering, the humidified powder is moved to a dryer (D) to remove moisture and produce agglomerated CNTs (E).

The target bulk density of the agglomerated material is from 0.1 to 0.8 $g/cm^3$, optionally from 0.2 to 0.6 $g/cm^3$.

Briquetting

In another implementation of the process, compacting may further include briquetting the agglomerated raw CNT powder to produce briquettes of raw CNTs before subjecting the raw CNTs to thermal treatment. Addition of inorganic base in aqueous solution, or addition of water may be performed during the step of briquetting. In this case, a step of drying may be implemented to remove moisture before producing the briquetted material.

Referring to FIG. 3, in order to increase the bulk density to a higher value, the agglomerated material (E) is treated as follows: the agglomerated material is deaerated in a vacuum-deaerated system (F) for the same reason as cited above. Then it is transferred to a mixer (G) where the material is mixed in two steps in the presence of a hot water for a much longer time than the agglomeration step. The humidified agglomerated material is then sent to a compactor (H) to increase the bulk density thereof. The briquettes are prepared by cutting the compacted material using a nibbler (I). Another step of drying is required before sintering, where the humidified powder is moved to a dryer (J) to remove moisture from the briquettes and produce briquetted material (K).

The target bulk density of the briquetted material is between 0.1 and 0.8 $g/cm^3$, particularly between 0.2 and 0.3 $g/cm^3$.

It should be noted that the briquetting step may be optional, and that agglomeration may be the only step performed to increase a bulk density of the raw CNTs. Depending on the initial bulk density of the raw CNTs, i.e. if the initial bulk density is sufficiently high, compacting includes agglomeration only to reach a bulk density threshold.

Sintering Implementations

The purification process includes a sintering step, comprising a thermal treatment, during which the compacted raw CNTs are heated above the evaporation temperature of the metal from the metallic impurity to be removed. Impurities, such as metallic impurities, in particular iron, may therefore be vaporized to improve purity of the CNTs. The sintering step may be performed, for example, under gaseous nitrogen or chlorine atmosphere.

In some implementations of the process, the sintering temperature may be between 1200° C. and 3000° C., optionally between 1500° C. and 2800° C., further optionally between 2000° C. and 2500° C., and further optionally, 2300° C. The residence time in the kiln performing the thermal treatment may be between 1 hours and 8 hours, optionally between 2 hours and 6 hours, further optionally between 2 hours and 4 hours, and further optionally 3 hours.

Referring to FIGS. 1 to 5, the sintering step may include feeding the compacted raw CNTs, in the form of agglomerated, granulated or briquetted CNTs, to a firing furnace which may be a continuous kiln or a batch kiln. The gaseous sintering atmosphere may be advantageously chlorine or nitrogen atmosphere. Advantageously, the firing furnace is operated continuously and at least one sintering line can be designed according to a length needed to treat the raw material input.

In some implementations, the process includes a sintering step consisting of subjecting the compacted raw CNTs to a heat treatment, under chlorine gas atmosphere, in a pulse vacuum system so as to produce removable chloride gas and purified CNTs in the form of briquettes, for example. The exhaust chloride gas may be disposed out of the furnace in a secured way.

Referring to FIGS. 2 to 5, the sintering step may be performed in a firing furnace which is a batch kiln. Several sintering units may be designed and operated in parallel, so as to adapt to the quantity of raw CNTs to be purified. For example, at least 33 units are needed if the bulk density after briquetting is about 0.2 $g/cm^3$.

Chlorine gas is used to remove metallic impurities (Fe, Cr, Co, Ni, Mn, etc.) effectively with the formation of chloride gas compounds by thermal reaction at high temperature. Reactions with iron and chromium are as follows:

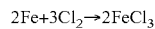

$$2Fe+3Cl_2 \rightarrow 2FeCl_3$$

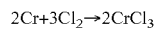

$$2Cr+3Cl_2 \rightarrow 2CrCl_3$$

Consequently, metallic impurities react with high temperature chlorine and are chemically converted to chloride gaseous compounds. Using chlorine gas during sintering can present substantial advantages, including reduction of damages impacting the CNT powder, in comparison to other available treatments in acid solution or at extremely high temperature (2800 to 3000° C.).

Referring to FIG. 3, in order to produce purified CNTs, the briquetted material (K) is treated as follows: the material (E) is submitted to a sintering step (L) (batch or continuous), followed optionally by a step of dispersion (M) and, after packaging (N), the purified CNTs (O) are ready to use.

Conditioning Implementations

In some implementations, the purification process may include conditioning the purified CNTs in an adequate form for a future application.

Referring to FIG. 6, the process may include a dispersion step for dispersing the purified agglomerates or briquettes of CNTs and reducing their bulk density.

Equipment can include a tank discharger, a screw feeder, an oscillating agitator (1 to 4) and a high-performance powder processing machine (1 to 4).

The screw of the feeder and the oscillating agitator are used to feed the purified CNTs, after sintering, to the high-performance powder processing machine. Via the high-performance powder processing machine, a combination of compression, shearing and impact forces is applied to the particle, leading to efficient formation of nanoparticles without any binder. The rotor top speed is between 20 and 40 m/sec, with a capacity between about 20 and 40 Kg/h per machine unit. Optionally, the target bulk density after conditioning is between 0.21 and 0.25 $g/cm^3$.

Still referring to FIG. 6, the process may include a packaging step for packaging the purified CNTs so as to be ready to use in various applications requiring a high level of purity (less than 50 ppm of metallic impurities).

The purified CNTs are generally packaged in containers, avoiding any further contamination by metallic impurities, by optionally using a device of the "Buck®" or "Glatt®" type.

For example, the purified CNTs may be packaged in plastic drum with lid and handles, to be easily stored and transported.

It should be understood that various operating parameters (including sintering temperature, residence time in the furnace) play a critical role and should be optimized and well selected in accordance with the quantity of impurities to be removed or the level of purity to be reached for a specific application.

It should be noted that each of the above-mentioned aspects of the purification process may be applied to single-wall carbon nanotubes and/or multiple-wall carbon nanotubes.

Lithium-Ion Batteries Implementations

It should be noted that the purified CNTs can be used as an electrical conductive additive in both anode and cathode based material in lithium-ion batteries, but are not limited to such an application.

In another aspect of the invention, there is provided an electrode material comprising purified CNTs as defined herein or as produced by the present purification process. The electrode material may include the CNTs as sole electrochemically active material, or in combination with other elements, such as $LiFePO_4$ or $LiNi_{0.33}Mn_{0.33}Co_{0.33}O_2$. The electrode material may also include the CNTs to serve as conductive material.

For instance, the electrode material may include at least one electrochemically active material in addition to the CNTs. Examples of electrochemically active materials (EAM) includes, without limitation, particles of titanates, lithium titanates, lithium metal phosphates, vanadium oxides, lithium metal oxides, and combinations thereof. For instance, the electrochemically active material may be selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. Such EAM particles may be further coated, for example, with carbon or CNTs.

The electrode materials may also include further components such as additional conductive material (e.g. graphene, graphite, carbon black, Ketjen® black, Denka® black, carbon fibers like VGCF®, non-powdery carbon coating from pyrolysis of an organic precursor, or a combination thereof), inorganic particles, salts, and/or one or more binders. Examples of binders include, without limitation, SBR (styrene butadiene rubber), NBR (butadiene acrylonitrile rubber), HNBR (hydrogenated NBR), CHR (epichlorohydrin rubber), ACM (acrylate rubber), CMC (carboxymethyl cellulose), PVDF (polyvinylidene fluoride), PTFE (polytetrafluoroethylene), and the like.

The electrode material may be prepared as a dry mixture or as a slurry in a solvent and be coated on the current collector, for example, by the Doctor Blade method or slot die method. When a solvent is present, a drying step may be further included.

Electrochemical cells comprising an electrode as herein defined, an electrolyte and a counter-electrode are also contemplated as well as their use, for example, in electrical or hybrid vehicles, or in information technology devices.

EXPERIMENTATION AND RESULTS

Each step of the purification process can be scaled and designed to adapt to the quantity of the CNTs to be purified and the quantity of purified CNTs to be produced. For example, various operations within a process step may be performed repeatedly on a same operation line in batch mode, or a plurality of equivalent lines of operation may be operated in parallel or in series.

Examples 1 to 3 illustrate various implementations of one or multiple steps of the purifications process according to the present invention. More specifically, these examples provide different encompassed options for the process steps illustrated in FIG. 1, and for which thermal treatment is performed under nitrogen atmosphere.

Example 1 (According to the Invention)

Example 1 is a particular implementation of the purification process, as illustrated in FIG. 4, including a step of agglomeration of the raw CNT powder to form agglomerates of raw CNTs, then a sintering step to produce agglomerates of purified CNTs. Complementary steps for deaerating the CNT powder before agglomeration, and for drying the produced agglomerates are further performed to improve the purification process performance.

Referring to FIG. 4, a deaerating device, including a feeding screw T1, is used to deaerate the raw CNT powder (10). Deaeration phenomenon contributes to the compacting of the powder, and thus to the increase of the bulk density of the powder of raw CNTs, by eliminating air and interstitial space between powder particles of raw CNTs. Deaeration is a preparatory step increasing the success of the subsequent agglomeration step. The top speed of the feeding screw is between 0.5 and 1.5 m/sec, and the capacity of the screw is between 60 and 150 Kg/h. Deaeration is further ensured by a vacuum system T2 in order to have a deaeration pressure of about −20 KPa (considered as total vacuum). The bulk density of the raw CNT powder (10) is between 0.04 and 0.11 g/cm³.

Compacting is further performed via a main step of agglomeration during which the deaerated raw CNT powder (12) is transferred to three mixers T3 which are continuously fed and associated in series. Agglomeration is performed according to three phases as the powder is successively fed to the three mixers T3. The first phase of the mixing is performed with hot water addition (14) at 70° C. to serve as binder, according to a ratio of about 20 to 40 weight % of raw CNTs for 60 to 80 weight % of hot water. Second and third phases of the mixing aim at increasing a size of the agglomerates of the raw CNT powder, according to a few seconds of retention time (3 to 30 seconds) per mixer. The top speed of the blade of each mixer is comprised between 20 and 40 m/sec, and the capacity of each mixer is comprised between 50 and 100 kg/h. The bulk density of the humid agglomerates of raw CNTs (16) which are finally obtained is comprised between 0.2 and 0.3 g/cm³.

Agglomeration is finalized with drying the humid agglomerates of raw CNTs (16). Drying includes feeding the humid agglomerates (16) into a fluidized bed dryer T6, creating a turbulence among the agglomerates of raw CNTs for drying thereof. The bed is fluidized via air circulation. Heating of the air is further performed in order to provide heat to the humid agglomerates (16). The air which was sent into the dryer T6 is heated via at least one heat exchanger T9. The air inlet temperature is comprised between 100 and 180° C., and the air outlet temperature is comprised between 50 and 120° C. The air speed in the fluidized bed is comprised between 0.5 and 3 m/sec.

Pursuant to this drying, agglomerates moisture is reduced, even eliminated, and dry raw CNT agglomerates (18) are produced.

A collector T11 is connected to the fluidized bed dryer T6 to collect all fine particles, in order to reduce dust and comply with local environmental requirements.

Sintering of the dry agglomerates (18) is then performed in a furnace T10 according to available and known means of a person skilled in the art (see for instance example 5 for more details).

Example 2 (According to the Invention)

Example 2 is a particular implementation of the purification process, illustrated in FIG. 5, including a step of briquetting the raw CNT powder to form briquettes of raw CNTs, then a sintering step of sintering to form purified briquettes of CNTs.

Complementary steps of deaeration of the powder before briquetting and drying of the produced briquettes are also performed to improve purification process performance.

According to FIG. 5, same conditions and equipment as detailed in example 1 are used to proceed to deaeration of the raw CNT powder (10), having a bulk density between 0.04 and 0.11 g/cm$^3$, including a screw feeder C1 and a vacuum system C2, in order to recover a deaerated raw CNT powder (12) having a higher bulk density. The deaerated raw CNT powder (12) is then transferred to a mixer C3 which is continuously fed and in which water is added at 70° C. to serve as binder, and with a ratio of 80 to 90 weight % of raw CNTs for 10 to 20 weight % of hot water, and in order to produce humid primer agglomerates of raw CNTs (14).

These humid primer agglomerates (14) are then transferred to at least one vertical type conical screw blender C7. This transfer is performed in batch mode, and that via a feeding screw C6, because the retention time in the vertical type conical screw blender C7 is longer than for a typical agglomeration step (see example 1), and is comprised between 3 and 6 min per machine unit. The capacity of each mixer C7 is comprised between 0.5 and 1.5 m$^3$. The top speed of the screw of the mixer C7 is comprised between 0.5 and 1.5 m/sec. The bulk density of the produced raw CNT agglomerates (16) is comprised between 0.4 and 0.6 g/cm$^3$.

Then, the raw CNT agglomerates (16) are fed to a compactor C11, via a screw conveyor C10, such that the agglomerates (16) are heavily compacted. This compacting includes use of at least one roller, optionally two rollers, which pressure is comprised between 50 and 150 tons (corresponding to a linear roller pressure comprised between 2.2 and 15 tons/cm). The diameter of each roller is comprised between 300 and 600 mm and the width of the roller is comprised between 100 and 500 mm. Compacted raw CNTs (18) are then sent to a crusher C13, which finalizes briquetting by cutting the compacted powder into briquettes (20).

As per example 1, a drying step can be performed in order to reduce or eliminate moisture traces. The drying includes feeding the humid briquettes of raw CNTs (20) to a fluidized bed dryer C14, by creating a turbulence among the briquettes (20) for drying thereof. The bed is fluidized via air circulation. Air heating is also performed in order to provide heat to the briquettes (20). The air sent into dryer C14 is heated via at least one heat exchanger C17. The inlet temperature of the air is comprised between 100 and 180° C. and the outlet temperature is comprised between 50 and 120° C. The air speed in the fluidized bed is comprised between 0.5 and 3 m/sec. Pursuant to this drying, moisture of the briquettes (20) is reduced, even eliminated, and dry briquettes (22) of raw CNTs are produced.

A collector C19 is connected to the fluidized bed dryer C14 to collect any fine particles, in order to reduce dust and comply with environmental requirements.

Sintering of the dry briquettes (22) is then performed in a furnace C23 according to available and known means of a person skilled in the art (see for instance example 5 for more details).

Example 3 (According to the Invention)

Example 3 illustrates optional process steps that can be performed subsequently to sintering (200), and in order to perform a conditioning (300) (see FIG. 1).

According to FIG. 6, the purification process can, depending on the compacting steps (agglomeration (102) or briquetting (104)) and the sintering step (200), include a dispersion step (302) designed to disperse the purified CNT agglomerates (18) or briquettes (22). Dispersion is performed via at least four Nobilta™ type mixers—NOB-700. The top speed of the rotor is comprised between 20 and 40 m/sec, with a capacity comprised between about 20 and 40 Kg/h per machine unit. The resulting bulk density after dispersion is comprised between 0.21 and 0.25 g/cm$^3$. In this example, four operation lines are configured in parallel, in order to adequately disperse the purified CNT quantity. The conditioning also includes a packaging step (304), including use of an automated hygienic weighting and loading system of the purified CNTs with a loading capacity from 1 to 80 Kg±10 g.

Regarding preceding examples 1 and 2, a person skilled in the art will understand that equipment is provided for illustrative purposes only. Thus, equipment size and number of operation lines can vary and be selected according to the volume of material to be purified and characteristics of the chosen equipment.

In examples 4 to 14, the following raw CNTs are used as feedstock of the purification process:

C100 Graphistrength®: CNT powder commercialized by Arkema company:
Bulk density 0.097 g/cm$^3$
Ash content (calcination under air at 900° C. for 3 h): 6.75 mass %
Iron content: 9700 ppm
Commercial CNT paste (from Dongheng New Energy Technology Co.)
Dry extract (drying under vacuum at 120° C. for 3 h): 6.8 mass %

Example 4 (Prior Art): C100 Graphistrength® CNTs Purification by High-Temperature Treatment A CNT purification process, only including a thermal treatment, was reproduced in this Example 4 according to a method known in the prior art.

In order to proceed to the thermal treatment in question, a weight of 80 g of C100 Graphistrength® was placed in a 1.1 L graphite crucible. The raw CNTs containing graphite crucible was placed in a static furnace for graphitization under nitrogen flow as inert gas. A profile of the ambient temperature inside the furnace is applied as follows: 1) rise to 2400° C. according to a rising rate of 3.3° C./min (12 h total), 2) stabilization at 2400° C. for 12 h; 3) decline to ambient temperature (about 25° C.) in 24 h. The total duration of the operation is then 48 hours.

Purified C100 Graphistrength® is then obtained, and is characterized by a bulk density of 0.095 g/cm$^3$ and an ash content of 0%. The bulk density loss and the ash content reduction to zero indicates that a sole thermal treatment allows to remove aluminum (Al) and iron (Fe) based metallic impurities corresponding to the catalytic residual.

Example 5 (According to the Invention): C100 Graphistrength® CNTs Purification 10 kg of C100 Graphistrength® was submitted, as raw CNT powder, to the following implementation of the purification process according to the invention:

Step 1: Briquettinq

Compacting includes a preliminary agglomeration of the raw CNT powder in the mixer, in presence of hot water at 80° C., which is added in an amount of 10 wt % with respect to the raw CNT powder. The resulting agglomerated and humidified CNT powder was then sent to a compactor (Kompaktor® CS-25) so as to increase the bulk density thereof. The compacted material was then cut into briquettes with a nibbler ensuring mechanical shear. These briquettes were then transferred to a dryer in order to remove moisture and produce dry raw CNT briquettes, which length is a few mm, for example between 8 and 9 mm.

The bulk density of the dry material is comprised between 0.1 and 0.5 $g/cm^3$, more particularly comprised between 0.15 and 0.4 $g/cm^3$, and even more particularly comprised between 0.17 and 0.25 $g/cm^3$. The variation in bulk density is influenced by the raw CNT elasticity which can prevent the bulk density from reaching a higher value.

Step 2: High-Temperature Thermal Treatment

The process includes a high-temperature treatment which is performed by feeding a furnace with the raw CNT briquettes which are placed into graphite crucibles. The inert atmosphere is enabled by a nitrogen flow. The thermal treatment step is performed in a batch furnace.

Figure 7:
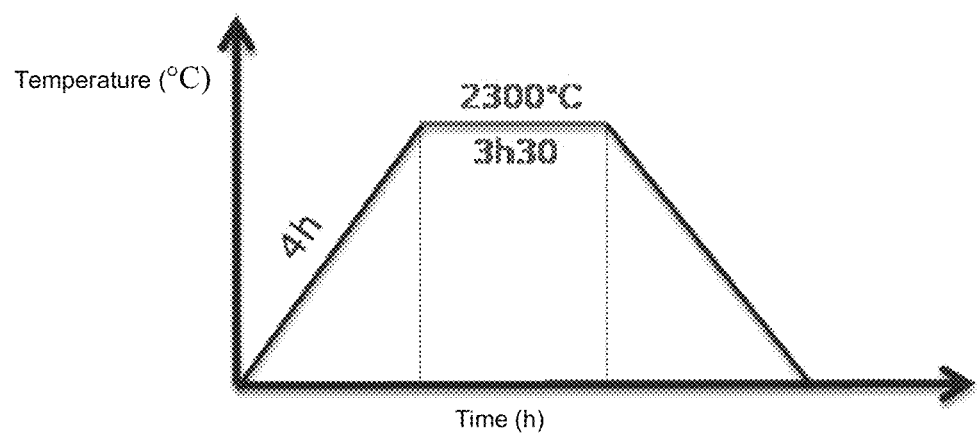
FIG. 7 is a graph showing the temperature profile of a thermal treatment versus time during a sintering step according to another embodiment of the present invention.

The cooking of the raw CNT briquettes is performed according the temperature profile illustrated in FIG. 7. The temperature is gradually raised by about 25° C. step up to 2300° C. during 4 h, then maintained at 2300° C. during 3h30, and finally the briquettes are cooled down to ambient temperature (about 25° C.).

The bulk density of the briquettes after cooling is comprised between 0.1 and 0.5 $g/cm^3$, optionally between 0.17 and 0.2 $g/cm^3$, and more particularly of about 0.18 $g/cm^3$. It is to be noted that the bulk density is substantially maintained, and that despite the thermal treatment.

The iron content analysis after thermal treatment revealed a value between 10 and 50 ppm, which leads to conclude to a decrease of >99.5% of metallic impurities.

A conditioning is then performed via dispersion with a Nobilta® NOB-300 type equipment, in order to disperse purified briquettes (by converting them into agglomerates) and reach a final bulk density of about 0.24 $g/cm^3$ comprising agglomerates having an average diameter D50 in the order of 4 μm.

Example 6 (Comparative): Preparation of a Dispersion of Purified CNTs According to a Prior Art Method A conditioning of purified CNTs according to example 4 (prior art) is performed according to a method known by a person skilled in the art. In a dispersion disk type mixer, an inox container of 1.5 L total volume is filled with 94.8 g of NMP (N-Methyl-2-pyrrolidone). In a first step, 0.2 g of PVDF (polyvinylidene fluoride resin) is introduced into NMP at 50° C. by mixing at a mixer rotation speed of 200 rpm. After 30 min of mixing, 5 g of purified CNTs according to example 4 are introduced into the mixer. Then, everything is mixed during 1 h at a mixer rotation speed of 400 rpm.

Subsequent to this preliminary dispersion, the mixture is introduced into a horizontal ball mill of the trademark Dispermat® SL (provided by Brant ind.) having a 1 L capacity including ceramic beads of 0.7 mm diameter. The crushing is performed in recirculation mode (several crushing cycles) during 50 min.

The viscosity of the resulting dispersion, comprising 5 wt % of purified CNTs, is of 8500 mPa·s (measured by the Brookfield method).

Example 7 (According to the Invention): Preparation of a Dispersion of Purified CNTs According to the Invention The same dispersion method as described in example 6 is reproduced by using purified CNTs pursuant to the thermal treatment of the present process as detailed in example 5.

The dispersion of purified CNTs, comprising 5 wt % of purified CNTs, had a viscosity of 3200 mPa·s (according to the Brookfield method).

It is to be noted that the dispersion resulting from the purified CNTs as per the thermal treatment according to the present invention has a more fluid consistency (lower viscosity) than the dispersion resulting from the purified CNTs as per the thermal treatment from the prior art. Advantageously, the resulting dispersion has therefore a consistency which is less pasty and enables a better processability in comparison to the dispersion resulting from example 6.

Example 8 (Comparative Reference): Dispersion of Commercial CNTs

In order to evaluate the purification process efficiency of the present invention, a commercially available paste of purified CNTs is analyzed to be considered as a reference dispersion of purified CNTs. A thermogravimetric analysis (TGA) under nitrogen confirmed the presence of 5 wt % of CNTs and of 1.8 wt % of organic additives in the commercial dispersion. In addition, the viscosity (according to the Brookfield method) of this commercial dispersion is comprised between 10 000 and 11 000 mPa·s.

Examples 6 to 8 thus show dispersions including purified CNTs from multiple sources (including purified CNTs according to the present process) and these dispersions are used to manufacture $LiNi_{0.33}Mn_{0.33}Co_{0.33}O_2$ (NMC) electrodes as described in examples 9 to 11, and that in order to compare performance of these electrodes. The obtained results are presented in FIG. 8 which gathers results from the power test of the NMC versus lithium electrodes in presence of the multiple CNT sources as carbonated additives of the electrodes.

The dispersions from examples 6 to 8 are also used to manufacture $LiFePO_4$ (LFP) electrodes as described in examples 12 to 15, and that in order to compare the performance of these electrodes. The obtained results are presented in FIG. 9, which gathers the power test results from the LFP versus lithium electrodes in presence of the multiple CNT sources as carbonated additives of the electrode.

Example 9 (Comparative): Use of the Commercial CNT Dispersion from Example 8 to Manufacture an Electrode and Evaluate the Performance of the Manufactured Electrode In this example, the commercial CNT dispersion presented in example 8 is used as carbonated additive to manufacture an electrode having an active material of formula $LiNi_{0.33}Mn_{0.33}Co_{0.33}O_2$ (NMC).

A solution is prepared in a planetary mixer for a 30 min period by mixing the commercial CNT dispersion in presence of the NMP solvent. The composition of the solution is the following: 92.5% NMC as active material, 1% of CNTs according to example 8 and 0.5% of Denka Li-100 as carbonated additive, 0.6% of dispersant in CNT paste and 5.4% PVDF as binder.

The manufactured electrodes are then dried at 120° C. under vacuum during a night to eliminate the remaining NMP solvent. A calendering step is performed in order to reduce electrode porosity. The final load is in the order of 6.8 mg/cm² of NMC.

These electrodes were electrochemically evaluated as materials of the coin-cell cathode versus lithium anode in presence of a $LiPF_6$ based organic electrolyte solution. The cycling terminals of the system were of 2.8-4.2V.

After a slow-regimen formation (C/24), at ambient temperature, the electrodes were evaluated in variable regimen according to the following protocol: charge at C/12 rate and discharge at C/12 rate, charge at C/8 rate and discharge at C/8 rate, charge at C/4 rate and discharge at C/4 rate, then discharge at C/2, C, 2C, 4C, 8C, 10C, 15C, 20C, 30C, 35C and 40C rate while always maintaining the charge at C/4 rate.

Figure 8:
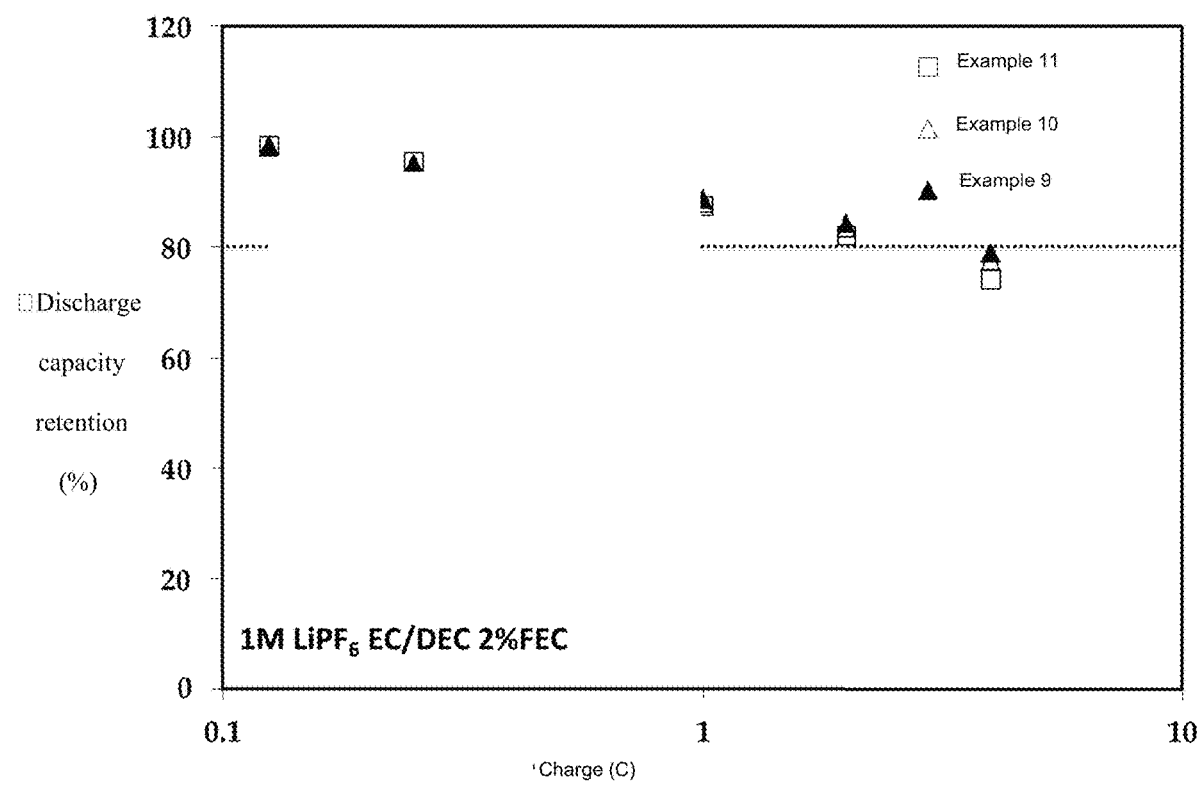
FIG. 8 is a graph showing retention of discharge capacity (in %) versus charge (C) for three electrodes manufactured according to the methods detailed in examples 9, 10 and 11 respectively.

The obtained results are presented in FIG. 8. If the end of life of a battery is considered to correspond to a state wherein said battery has lost 80% of its initial capacity, the retention of 80% of the initial capacity of the thus manufactured electrodes is maintained up to 4C and is in the order of 110 mAh/g.

Example 10 (Comparative): Use of the Dispersion of Purified CNTs from Example 6 for the Manufacture of an Electrode and Evaluation of Performances of the Manufactured Electrode In this example, the purified CNTs from the dispersion resulting from example 8 are used as carbonated additives in an NMC electrode ($N_{1/3}M_{1/3}C_{1/3}$ based, as active material).

The preparation of a solution as described in example 9 is reproduced, by using 1% of the purified and dispersed CNTs according to the method presented in example 6. The resulting electrodes are tested in the same manner as in example 9.

The obtained results are presented in FIG. 8. If the end of life of a battery is considered to correspond to a state wherein said battery has lost 80% of its initial capacity, the retention of 80% of the initial capacity of the thus manufactured electrodes is maintained up to 4C and is in the order of 110 mAh/g.

Example 11 (According to the Invention): Use of the Purified CNTs According to the Present Process for the Manufacture of an Electrode and the Evaluation of Performances of the Manufactured Electrode In this example, the purified CNT powder resulting from the steps presented in example 5 was used as is, i.e. without prior dispersion thereof in a solvent, as carbonated additive to manufacture an electrode, which is based on the NMC as active material.

A solution is prepared in a planetary mixer during a residence time of 30 min in presence of NMP as a solvent. The composition of the resulting is the following: 93% NMC as active material, 1.4% purified CNTs according to example 5 and 1% Denka Li-100 as carbonated additives and 4.6% PVDF as binder.

The resulting electrodes are then dried at 120° C. under vacuum during a night to eliminate NMP solvent remaining. A calendering step is performed in order to reduce porosity of the electrodes. The final load is about 6.8 mg/cm² of NMC.

The thereby manufactured electrodes were electrochemically evaluated as materials of the coin-cell cathode versus lithium as anode in presence of a $LiPF_6$-based solution of organic electrolyte as described in examples 9 and 10.

As illustrated in FIG. 8, the retention of 80% of the initial capacity of the electrodes manufactured from purified CNT powder according to the process proposed herein is maintained up 4C and is in the order of 110 mAh/g.

Example 12 (Comparative): Use of the Commercial CNT Dispersion (Paste) from Example 8 of the Manufacture of an Electrode and Evaluation of Performances of the Electrode In this example, the commercial CNT dispersion is used as carbonated additive to manufacture an electrode which is based on $LiFePO_4$ (LFP) as active material.

A solution is prepared in a planetary mixer for a 30-min period in presence of NMP as a solvent. The composition of the obtained solution is the following: 89.6% LFP as active material, 2.7% CNT, 2.7% Denka Li-100 as carbonated additives and 5% PVDF as binder. The hereby obtained electrodes are then dried at 120° C. under vacuum during a night to eliminate NMP solvent remaining. A step of calendering is performed in order to reduce the electrode porosity. The final load is in the order of 5.4 mg/cm² of LFP.

These electrodes were electrochemically evaluated as carbonated material of the coin-cell cathode versus lithium as anode in presence of a $LiPF_6$-based solution of organic electrolyte.

The cycling terminals of this system are comprised between 2 and 4V. After a slow regimen (C/24) formation, at ambient temperature, the electrodes were evaluated in variable regimen according to the following protocol: charge at C/12 rate and discharge at C/12 rate, charge at C/8 rate and discharge at C/8 rate, charge at C/4 rate and discharge at C/4 rate, then discharge at C/2, C, 2C, 4C, 8C, 10C, 15C, 20C, 30C, 35C and 40C rate while always maintaining charge at C/4 rate.

Figure 9:
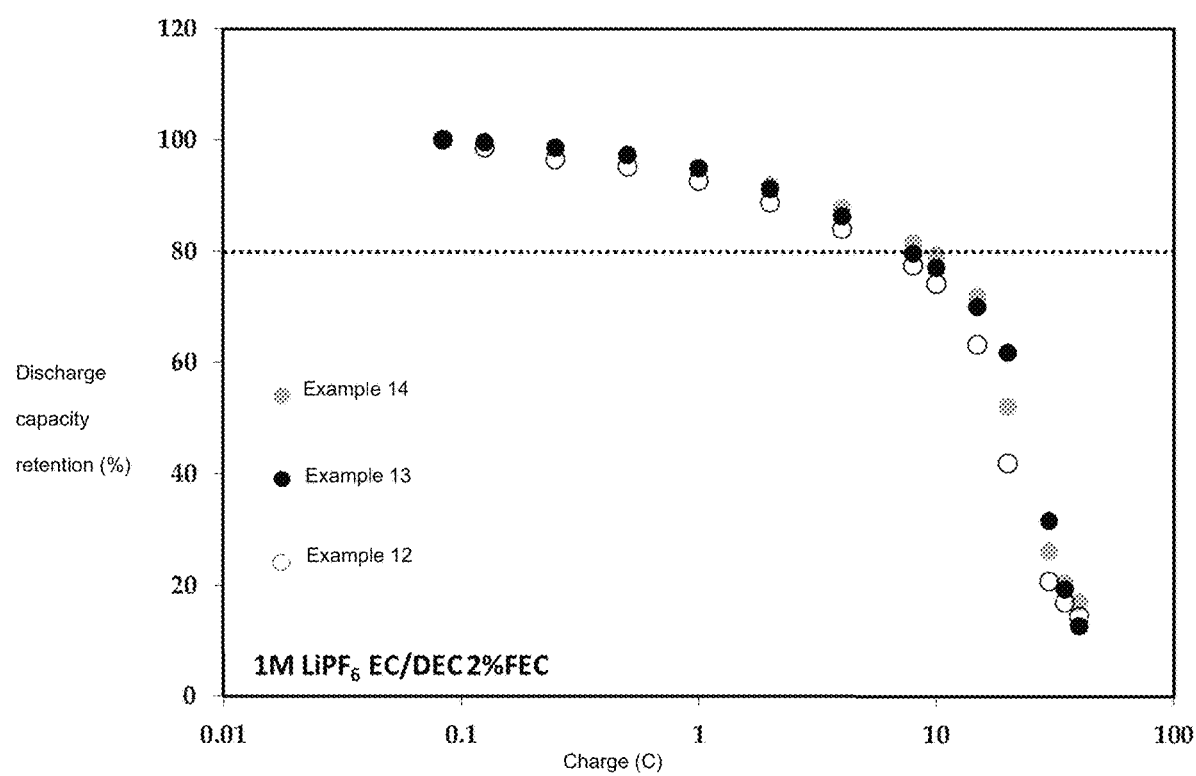
FIG. 9 is a graph showing retention of discharge capacity (in %) versus charge (C) for three electrodes manufactured according to the methods detailed in examples 12, 13 and 14 respectively.

The obtained results are presented in FIG. 9. If the end of life of a battery is considered to correspond to a state wherein said battery has lost 80% of its initial capacity, the retention of 80% of the initial capacity of these electrodes is maintained up to 4C which is in the order of 117 mAh/g.

Example 13 (Comparative): Use of the Purified CNT Dispersion According to Example 6 for the Manufacture of an Electrode and Evaluation of the Performances of the Manufactured Electrode The same electrode manufacture method as detailed in example 12 is followed, and that by using the purified CNT dispersion prepared according to example 6 in place of the commercial CNT paste according to example 8.

The obtained results are presented in FIG. 9. The retention of 80% of the initial capacity of the manufactured electrodes is maintained up to 10C which is in the order of 125 mAh/g.

Example 14 (According to the Invention): Use of a Purified CNT Dispersion According to the Present Process to Manufacture an Electrode and Evaluation of Performances of the Manufactured Electrode The same electrode manufacture method as detailed in example 9 is followed, and that by using the CNT dispersion prepared according to example 7 in place of the commercial CNT paste according to example 8.

The obtained results are presented in FIG. 9. The retention of 80% of the initial capacity of the manufactured electrodes is maintained up to 10C which is in the order of 125 mAh/g.

In summary of these different examples, the electrochemical performances of electrodes including CNTs purified according to the process proposed herein are substantially the same as of electrodes including purified CNTs which are commercially available or dispersed according to known methods. It is to be noted that the LFP cathode including purified CNTs according to the process proposed herein enabled to reach a better performance than the one from the prior art (that being 125 mAh/g).

In addition, it was showed that addition of CNTs under the form of powder purified according to the process proposed herein, in a NMC-based cathode and with only 0.5% of Denka Li-100 enables to obtain electrochemical performances, which are similar to other products commercialized under the form of pastes.

It is thus to be kept in mind that in a NMC cathode, a LFP cathode or other materials described herein, the CNTs which are purified according to the process proposed herein can be used as powder, without subsequent conditioning into paste. The commercially available purified CNTs are generally used as a paste wherein CNTs are dispersed in NMP in presence of other reactants which help maintaining the dispersion of these nanotubes. The lifetime of these pastes is however of the order of a few months only. Advantageously, stability of the purified CNT powder obtained according to the implementations of the process presented herein above enables to lengthen the longevity thereof while being directly usable for electrochemical applications.

These examples highlight the advantages procured by the CNTs obtained according to the implementations of the process presented herein when used as carbonated additives in electrodes materials for lithium-ion batteries.

The invention claimed is:

1. A process of purification of raw carbon nanotubes comprising metallic impurities, the process comprising:
   compacting the raw carbon nanotubes to produce compacted raw carbon nanotubes having a bulk density higher than that of the raw carbon nanotubes;
   sintering the compacted raw carbon nanotubes including a thermal treatment under gaseous atmosphere, to remove at least a portion of the metallic impurities and produce purified carbon nanotubes; and
   conditioning the purified carbon nanotubes to produce conditioned purified carbon nanotubes for a direct application, wherein the conditioning comprises dispersing the purified carbon nanotubes to reduce the bulk density thereof to between 0.21 and 0.25 g/cm$^3$.

2. The process according to claim 1, wherein the compacting of the raw carbon nanotubes comprises agglomerating the raw carbon nanotubes to produce agglomerated carbon nanotubes having a bulk density comprised between 0.1 and 0.8 g/cm$^3$.

3. The process according to claim 1, wherein the compacting of the raw carbon nanotubes comprises briquetting the raw carbon nanotubes to produce briquettes of carbon nanotubes having a bulk density comprised between 0.1 and 0.8 g/cm$^3$.

4. The process according to claim 1, wherein the compacting of the raw carbon nanotubes comprises extruding the raw carbon nanotubes to produce granules or pellets of extruded raw carbon nanotubes having a bulk density comprised between 0.2 and 0.3 g/cm$^3$.

5. The process according to claim 1, wherein the compacting comprises at least one of the following:
   agglomerating;
   briquetting; and
   extruding.

6. The process according to claim 5, wherein the compacting only comprises agglomerating when the bulk density of the raw CNTs is of at least 0.2 g/cm$^3$.

7. The process according to claim 1, wherein the gaseous atmosphere during thermal treatment comprises chlorine gas, and wherein the metallic impurities are removed by a pulse vacuum system after chlorination of the metals by the chlorine gas.

8. The process according to claim 1, wherein the gaseous atmosphere during thermal treatment comprises nitrogen gas and wherein the metallic impurities are removed by vaporization.

9. The process according to claim 1, wherein the thermal treatment is performed at a sintering temperature comprised between 1,200° C. and 3,000° C.

10. The process according to claim 1, wherein the thermal treatment is performed in a pusher continuous kiln or in a batch kiln.

11. The process according to claim 1, comprising adding an inorganic base in aqueous solution or adding water before, during or after the compacting of raw carbon nanotubes.

12. The process according to claim 11, wherein the aqueous solution of inorganic base or the water is added at a temperature between 20 and 80° C.

13. The process according to claim 11, comprising drying the compacted raw carbon nanotubes in order to remove moisture therefrom.

14. The process according to claim 1, wherein the conditioning further comprises packaging the purified carbon nanotubes.

15. The process according to claim 1 wherein the raw carbon nanotubes are of multi-walled type presenting a length/diameter ratio superior to 10, a specific surface area comprised between 100 and 300 m$^2$/g, and a bulk density comprised between 0.02 and 0.5 g/cm$^3$.

16. The process according to claim 15, wherein the purified carbon nanotubes have a metallic impurities content between 5 ppm and 200 ppm.

17. The process according to claim 1, wherein the metallic impurities comprise iron.

* * * * *